United States Patent
Hsu et al.

(10) Patent No.: US 9,772,470 B2
(45) Date of Patent: Sep. 26, 2017

(54) IMAGING LENS, AND ELECTRONIC APPARATUS INCLUDING THE SAME

(71) Applicant: Genius Electronic Optical Co., Ltd., Taichung (TW)

(72) Inventors: Sheng-Wei Hsu, Taichung (TW); Tzu-Chien Tang, Taichung (TW)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 88 days.

(21) Appl. No.: 14/629,911

(22) Filed: Feb. 24, 2015

(65) Prior Publication Data

US 2016/0131868 A1    May 12, 2016

(30) Foreign Application Priority Data

Nov. 6, 2014   (TW) .............................. 103138531 A

(51) Int. Cl.
| | | |
|---|---|---|
| *G02B 13/18* | (2006.01) | |
| *G02B 13/00* | (2006.01) | |
| *G02B 7/02* | (2006.01) | |
| *G02B 9/34* | (2006.01) | |

(52) U.S. Cl.
CPC ............ *G02B 13/004* (2013.01); *G02B 7/021* (2013.01); *G02B 9/34* (2013.01)

(58) Field of Classification Search
CPC . G02B 9/00; G02B 9/34; G02B 13/00; G02B 13/0015; G02B 13/002; G02B 13/004; G02B 13/008
See application file for complete search history.

(56) References Cited

U.S. PATENT DOCUMENTS

| | | | |
|---|---|---|---|
| 7,295,386 B2 * | 11/2007 | Taniyama ............ | G02B 13/004 359/772 |
| 7,692,877 B2 | 4/2010 | Tang et al. | |
| 7,755,853 B2 * | 7/2010 | Taniyama ............ | G02B 13/004 359/715 |
| 8,068,290 B1 * | 11/2011 | Tsai ..................... | G02B 13/004 359/715 |
| 8,179,470 B2 * | 5/2012 | Chen ..................... | G02B 9/34 348/335 |
| 8,325,269 B2 | 12/2012 | Chen et al. | |
| 8,422,146 B1 * | 4/2013 | Tsai ..................... | G02B 13/06 359/715 |
| 8,908,291 B1 * | 12/2014 | Chung ................. | G02B 13/004 359/715 |
| 2004/0136097 A1 * | 7/2004 | Park ..................... | G02B 9/34 359/773 |
| 2005/0105194 A1 * | 5/2005 | Matsui .................. | G02B 9/34 359/772 |

(Continued)

FOREIGN PATENT DOCUMENTS

| | | |
|---|---|---|
| JP | 2006184365 A | 7/2006 |
| JP | 2006293324 A | 10/2006 |
| JP | 4466713 B2 | 5/2010 |

(Continued)

*Primary Examiner* — Thong Nguyen
(74) *Attorney, Agent, or Firm* — Jianq Chyun IP Office

(57) ABSTRACT

An imaging lens includes first to fourth lens elements arranged from an object side to an image side in the given order. Through designs of surfaces of the lens elements and relevant optical parameters, a short system length of the imaging lens may be achieved while maintaining good optical performance.

13 Claims, 25 Drawing Sheets

(56) References Cited

U.S. PATENT DOCUMENTS

2013/0265652 A1* 10/2013 An .................... G02B 13/18
                                              359/715
2014/0184895 A1* 7/2014 Ahn .................... G02B 13/004
                                              348/369

FOREIGN PATENT DOCUMENTS

| JP | 4561634 B2 | 10/2010 |
|----|------------|---------|
| JP | 201195301 A | 5/2011 |
| TW | I320107 B | 2/2010 |
| TW | 201341838 A | 10/2013 |
| TW | 201407223 A | 2/2014 |
| TW | 201437676 A | 10/2014 |

* cited by examiner first preferred embodiment system focal length =1.563mm, half field-of-view =39.927°, F-number =2.056, system length =2.116mm

| lens element | surface | radius of curvature | thickness /air gap | refractive index | Abbe number | focal length |
|---|---|---|---|---|---|---|
| object | | ∞ | ∞ | | | |
| aperture stop 2 | | ∞ | 0.317 | | | |
| first lens element 3 | object-side surface 31 | 0.748 | 0.145 | 1.546 | 56.114 | 1.693 |
| | image-side surface 32 | 3.325 | 0.200 | | | |
| second lens element 4 | object-side surface 41 | -4.103 | 0.082 | 1.647 | 22.440 | -4.834 |
| | image-side surface 42 | 13.407 | 0.362 | | | |
| third lens element 5 | object-side surface 51 | -2.073 | 0.051 | 1.546 | 56.114 | 1.856 |
| | image-side surface 52 | -0.722 | 0.316 | | | |
| fourth lens element 6 | object-side surface 61 | 0.957 | 0.300 | 1.546 | 56.114 | -2.318 |
| | image-side surface 62 | 0.481 | 0.210 | | | |
| optical filter 9 | object-side surface 91 | ∞ | 0.133 | | | |
| | image-side surface 92 | ∞ | | | | |
| image plane 100 | | ∞ | | | | |

FIG. 7 first embodiment

| surface | 31 | 32 | 41 | 42 | 51 | 52 | 61 | 62 |
|---|---|---|---|---|---|---|---|---|
| K | -9.2E+00 | 0.0E+00 | -2.1E+01 | 0.0E+00 | 0.0E+00 | 0.0E+00 | -1.0E+00 | -1.0E+00 |
| a4 | 2.6E+00 | -4.2E-01 | -2.1E+00 | -1.6E-01 | 2.0E+00 | -7.1E-01 | -4.0E+00 | -4.1E+00 |
| a6 | -1.4E+01 | -4.6E+00 | 9.4E+00 | -2.0E+00 | -1.4E+01 | 1.5E+01 | 1.0E+01 | 1.3E+01 |
| a8 | 6.6E+01 | 7.8E+00 | -1.8E+02 | -1.2E+01 | 7.0E+01 | -1.3E+02 | -1.2E+01 | -3.5E+01 |
| a10 | -1.7E+02 | -7.1E+01 | 9.8E+02 | 7.4E+01 | -9.6E+01 | 9.4E+02 | 3.8E+00 | 6.3E+01 |
| a12 | 0.0E+00 | 0.0E+00 | -1.8E+03 | 0.0E+00 | -1.0E+03 | -3.9E+03 | 1.2E+01 | -7.9E+01 |
| a14 | 0.0E+00 | 0.0E+00 | 0.0E+00 | 0.0E+00 | 5.3E+03 | 9.6E+03 | -2.1E+01 | 6.5E+01 |
| a16 | 0.0E+00 | 0.0E+00 | 0.0E+00 | 0.0E+00 | -7.9E+03 | -1.4E+04 | 1.5E+01 | -3.4E+01 |
| a18 | 0.0E+00 | 0.0E+00 | 0.0E+00 | 0.0E+00 | 0.0E+00 | 1.2E+04 | -4.2E+00 | 1.0E+01 |
| a20 | 0.0E+00 | 0.0E+00 | 0.0E+00 | 0.0E+00 | 0.0E+00 | -3.7E+03 | 0.0E+00 | -1.3E+00 |

FIG.8 second preferred embodiment system focal length =1.558mm, half field-of-view =40.079°, F-number =2.056, system length =2.104mm

| lens element | surface | radius of curvature | thickness /air gap | refractive index | Abbe number | focal length |
|---|---|---|---|---|---|---|
| object | | ∞ | ∞ | | | |
| aperture stop 2 | | ∞ | | | | |
| first lens element 3 | object-side surface 31 | 0.747 | 0.308 | 1.546 | 56.114 | 1.801 |
| | image-side surface 32 | 2.663 | 0.140 | | | |
| second lens element 4 | object-side surface 41 | -17.968 | 0.200 | 1.647 | 22.440 | -5.513 |
| | image-side surface 42 | 4.469 | 0.099 | | | |
| third lens element 5 | object-side surface 51 | -2.113 | 0.345 | 1.546 | 56.114 | 1.842 |
| | image-side surface 52 | -0.721 | 0.050 | | | |
| fourth lens element 6 | object-side surface 61 | 0.936 | 0.314 | 1.546 | 56.114 | -2.421 |
| | image-side surface 62 | 0.483 | 0.300 | | | |
| optical filter 9 | object-side surface 91 | ∞ | 0.210 | | | |
| | image-side surface 92 | ∞ | 0.137 | | | |
| image plane 100 | | ∞ | | | | |

FIG. 11

| surface | second embodiment | | | | | | | |
|---|---|---|---|---|---|---|---|---|
| | 31 | 32 | 41 | 42 | 51 | 52 | 61 | 62 |
| K | -9.2E+00 | 0.0E+00 | -2.1E+01 | 0.0E+00 | 0.0E+00 | 0.0E+00 | -1.0E+00 | -1.0E+00 |
| a4 | 2.6E+00 | -4.3E-01 | -2.0E+00 | -3.4E-01 | 1.8E+00 | -7.3E-01 | -4.0E+00 | -4.1E+00 |
| a6 | -1.4E+01 | -4.8E+00 | 7.9E+00 | -1.3E+00 | -1.3E+01 | 1.5E+01 | 1.0E+01 | 1.3E+01 |
| a8 | 6.5E+01 | 1.1E+01 | -1.6E+02 | -1.5E+01 | 6.9E+01 | -1.3E+02 | -1.2E+01 | -3.4E+01 |
| a10 | -1.6E+02 | -7.4E+01 | 9.1E+02 | 7.9E+01 | -9.9E+01 | 9.4E+02 | 3.8E+00 | 6.3E+01 |
| a12 | 0.0E+00 | 0.0E+00 | -1.6E+03 | 0.0E+00 | -1.0E+03 | -3.9E+03 | 1.2E+01 | -7.9E+01 |
| a14 | 0.0E+00 | 0.0E+00 | 0.0E+00 | 0.0E+00 | 5.3E+03 | 9.6E+03 | -2.1E+01 | 6.5E+01 |
| a16 | 0.0E+00 | 0.0E+00 | 0.0E+00 | 0.0E+00 | -7.8E+03 | -1.4E+04 | 1.5E+01 | -3.4E+01 |
| a18 | 0.0E+00 | 0.0E+00 | 0.0E+00 | 0.0E+00 | 0.0E+00 | 1.2E+04 | -4.2E+00 | 1.0E+01 |
| a20 | 0.0E+00 | 0.0E+00 | 0.0E+00 | 0.0E+00 | 0.0E+00 | -3.7E+03 | 0.0E+00 | -1.3E+00 |

FIG.12 third preferred embodiment system focal length =1.539mm, half field-of-view =40.345°, F-number =2.056, system length =2.081mm

| lens element | surface | radius of curvature | thickness /air gap | refractive index | Abbe number | focal length |
|---|---|---|---|---|---|---|
| object | | ∞ | ∞ | | | |
| aperture stop 2 | | ∞ | | | | |
| first lens element 3 | object-side surface 31 | 0.736 | 0.320 | 1.546 | 56.114 | 1.654 |
| | image-side surface 32 | 3.371 | 0.149 | | | |
| second lens element 4 | object-side surface 41 | -2.517 | 0.200 | 1.647 | 22.440 | -6.256 |
| | image-side surface 42 | -6.865 | 0.082 | | | |
| third lens element 5 | object-side surface 51 | -1.460 | 0.321 | 1.546 | 56.114 | 2.235 |
| | image-side surface 52 | -0.716 | 0.050 | | | |
| fourth lens element 6 | object-side surface 61 | 0.849 | 0.311 | 1.546 | 56.114 | -2.748 |
| | image-side surface 62 | 0.472 | 0.300 | | | |
| optical filter 9 | object-side surface 91 | ∞ | 0.210 | | | |
| | image-side surface 92 | ∞ | 0.138 | | | |
| image plane 100 | | | | | | |

FIG. 15 third embodiment

| surface | 31 | 32 | 41 | 42 | 51 | 52 | 61 | 62 |
|---|---|---|---|---|---|---|---|---|
| K | -9.2E+00 | 0.0E+00 | -2.1E+01 | 0.0E+00 | 0.0E+00 | 0.0E+00 | -1.0E+00 | -1.0E+00 |
| a4 | 2.8E+00 | -3.7E-01 | -2.2E+00 | 1.3E-02 | 2.6E+00 | -5.4E-01 | -4.1E+00 | -4.2E+00 |
| a6 | -1.5E+01 | -5.3E+00 | 1.1E+01 | -3.1E+00 | -1.8E+01 | 1.5E+01 | 1.0E+01 | 1.4E+01 |
| a8 | 7.1E+01 | 1.2E+01 | -2.0E+02 | -8.7E+00 | 7.8E+01 | -1.3E+02 | -1.2E+01 | -3.5E+01 |
| a10 | -1.9E+02 | -9.5E+01 | 1.2E+03 | 8.0E+01 | -8.6E+01 | 9.4E+02 | 3.9E+00 | 6.3E+01 |
| a12 | 0.0E+00 | 0.0E+00 | -2.3E+03 | 0.0E+00 | -1.0E+03 | -3.9E+03 | 1.2E+01 | -7.9E+01 |
| a14 | 0.0E+00 | 0.0E+00 | 0.0E+00 | 0.0E+00 | 5.2E+03 | 9.6E+03 | -2.1E+01 | 6.5E+01 |
| a16 | 0.0E+00 | 0.0E+00 | 0.0E+00 | 0.0E+00 | -7.7E+03 | -1.4E+04 | 1.5E+01 | -3.4E+01 |
| a18 | 0.0E+00 | 0.0E+00 | 0.0E+00 | 0.0E+00 | 0.0E+00 | 1.2E+04 | -4.1E+00 | 1.0E+01 |
| a20 | 0.0E+00 | 0.0E+00 | 0.0E+00 | 0.0E+00 | 0.0E+00 | -3.6E+03 | 0.0E+00 | -1.3E+00 |

FIG.16

FIG. 19 fourth preferred embodiment system focal length =1.548mm, half field-of-view =40.295°, F-number =2.056, system length =2.090mm

| lens element | surface | radius of curvature | thickness /air gap | refractive index | Abbe number | focal length |
|---|---|---|---|---|---|---|
| object | | ∞ | ∞ | | | |
| aperture stop 2 | | ∞ | | | | |
| first lens element 3 | object-side surface 31 | 0.738 | 0.321 | 1.546 | 56.114 | 1.641 |
| | image-side surface 32 | 3.540 | 0.166 | | | |
| second lens element 4 | object-side surface 41 | -2.037 | 0.201 | 1.647 | 22.440 | -6.326 |
| | image-side surface 42 | -4.211 | 0.071 | | | |
| third lens element 5 | object-side surface 51 | -1.448 | 0.321 | 1.546 | 56.114 | 2.263 |
| | image-side surface 52 | -0.719 | 0.053 | | | |
| fourth lens element 6 | object-side surface 61 | 0.862 | 0.312 | 1.546 | 56.114 | -2.712 |
| | image-side surface 62 | 0.475 | 0.300 | | | |
| optical filter 9 | object-side surface 91 | ∞ | 0.210 | | | |
| | image-side surface 92 | ∞ | 0.135 | | | |
| image plane 100 | | ∞ | | | | | fourth embodiment

| surface | 31 | 32 | 41 | 42 | 51 | 52 | 61 | 62 |
|---|---|---|---|---|---|---|---|---|
| K | -9.2E+00 | 0.0E+00 | -2.1E+01 | 0.0E+00 | 0.0E+00 | 0.0E+00 | -1.0E+00 | -1.0E+00 |
| a4 | 2.7E+00 | -3.4E-01 | -2.4E+00 | -8.1E-03 | 2.6E+00 | -5.8E-01 | -4.1E+00 | -4.2E+00 |
| a6 | -1.5E+01 | -4.9E+00 | 1.2E+01 | -3.2E+00 | -1.8E+01 | 1.4E+01 | 1.0E+01 | 1.4E+01 |
| a8 | 7.1E+01 | 1.3E+01 | -2.0E+02 | -9.4E+00 | 7.8E+01 | -1.3E+02 | -1.2E+01 | -3.5E+01 |
| a10 | -1.8E+02 | -1.0E+02 | 1.2E+03 | 8.0E+01 | -8.4E+01 | 9.4E+02 | 3.9E+00 | 6.3E+01 |
| a12 | 0.0E+00 | 0.0E+00 | -2.3E+03 | 0.0E+00 | -1.0E+03 | -3.9E+03 | 1.2E+01 | -7.9E+01 |
| a14 | 0.0E+00 | 0.0E+00 | 0.0E+00 | 0.0E+00 | 5.2E+03 | 9.6E+03 | -2.1E+01 | 6.5E+01 |
| a16 | 0.0E+00 | 0.0E+00 | 0.0E+00 | 0.0E+00 | -7.7E+03 | -1.4E+04 | 1.5E+01 | -3.4E+01 |
| a18 | 0.0E+00 | 0.0E+00 | 0.0E+00 | 0.0E+00 | 0.0E+00 | 1.2E+04 | -4.1E+00 | 1.0E+01 |
| a20 | 0.0E+00 | 0.0E+00 | 0.0E+00 | 0.0E+00 | 0.0E+00 | -3.7E+03 | 0.0E+00 | -1.3E+00 |

FIG.20

FIG. 23 fifth preferred embodiment
system focal length =1.563mm , half field-of-view =39.895°, F-number =2.056, system length =2.097mm

| lens element | surface | radius of curvature | thickness /air gap | refractive index | Abbe number | focal length |
|---|---|---|---|---|---|---|
| object | | ∞ | ∞ | | | |
| aperture stop 2 | | ∞ | 0.101 | | | |
| first lens element 3 | object-side surface 31 | 0.745 | 0.317 | 1.546 | 56.114 | 1.836 |
| | image-side surface 32 | 2.472 | 0.200 | | | |
| second lens element 4 | object-side surface 41 | -246.965 | 0.140 | 1.647 | 22.440 | -7.551 |
| | image-side surface 42 | 4.985 | | | | |
| third lens element 5 | object-side surface 51 | -2.055 | 0.330 | 1.546 | 56.114 | 1.872 |
| | image-side surface 52 | -0.721 | 0.050 | | | |
| fourth lens element 6 | object-side surface 61 | 0.998 | 0.313 | 1.546 | 56.114 | -2.215 |
| | image-side surface 62 | 0.486 | 0.300 | | | |
| optical filter 9 | object-side surface 91 | ∞ | 0.210 | | | |
| | image-side surface 92 | ∞ | 0.136 | | | |
| image plane 100 | | | | | | | fifth embodiment

| surface | 31 | 32 | 41 | 42 | 51 | 52 | 61 | 62 |
|---|---|---|---|---|---|---|---|---|
| K | -9.2E+00 | 0.0E+00 | -2.1E+01 | 0.0E+00 | 0.0E+00 | 0.0E+00 | -1.0E+00 | -1.0E+00 |
| a4 | 2.6E+00 | -5.3E-01 | -2.0E+00 | -2.9E-01 | 1.7E+00 | -5.7E-01 | -4.0E+00 | -4.1E+00 |
| a6 | -1.4E+01 | -6.4E+00 | 8.9E+00 | -3.0E+00 | -1.4E+01 | 1.4E+01 | 1.0E+01 | 1.4E+01 |
| a8 | 6.2E+01 | 5.8E+00 | -2.0E+02 | -1.2E+00 | 7.4E+01 | -1.3E+02 | -1.2E+01 | -3.5E+01 |
| a10 | -1.6E+02 | -3.8E+01 | 1.2E+03 | 6.6E+01 | -9.8E+01 | 9.4E+02 | 3.8E+00 | 6.3E+01 |
| a12 | 0.0E+00 | 0.0E+00 | -2.3E+03 | 0.0E+00 | -1.1E+03 | -3.9E+03 | 1.2E+01 | -7.9E+01 |
| a14 | 0.0E+00 | 0.0E+00 | 0.0E+00 | 0.0E+00 | 5.3E+03 | 9.6E+03 | -2.1E+01 | 6.5E+01 |
| a16 | 0.0E+00 | 0.0E+00 | 0.0E+00 | 0.0E+00 | -7.6E+03 | -1.4E+04 | 1.5E+01 | -3.4E+01 |
| a18 | 0.0E+00 | 0.0E+00 | 0.0E+00 | 0.0E+00 | 0.0E+00 | 1.2E+04 | -4.1E+00 | 1.0E+01 |
| a20 | 0.0E+00 | 0.0E+00 | 0.0E+00 | 0.0E+00 | 0.0E+00 | -3.7E+03 | 0.0E+00 | -1.3E+00 |

FIG.24

| relationship | first embodiment | second embodiment | third embodiment | fourth embodiment | fifth embodiment |
|---|---|---|---|---|---|
| T1 | 0.317 | 0.308 | 0.320 | 0.321 | 0.317 |
| G12 | 0.145 | 0.140 | 0.149 | 0.166 | 0.101 |
| T2 | 0.200 | 0.200 | 0.200 | 0.201 | 0.200 |
| G23 | 0.082 | 0.099 | 0.082 | 0.071 | 0.140 |
| T3 | 0.362 | 0.345 | 0.321 | 0.321 | 0.330 |
| G34 | 0.051 | 0.050 | 0.050 | 0.053 | 0.050 |
| T4 | 0.316 | 0.314 | 0.311 | 0.312 | 0.313 |
| G4F | 0.300 | 0.300 | 0.300 | 0.300 | 0.300 |
| TF | 0.210 | 0.210 | 0.210 | 0.210 | 0.210 |
| GFP | 0.133 | 0.137 | 0.138 | 0.135 | 0.136 |
| BFL | 0.643 | 0.647 | 0.648 | 0.645 | 0.646 |
| EFL | 1.563 | 1.558 | 1.539 | 1.548 | 1.563 |
| ALT | 1.195 | 1.167 | 1.152 | 1.155 | 1.160 |
| Gaa | 0.278 | 0.289 | 0.281 | 0.290 | 0.291 |
| TTL | 2.116 | 2.103 | 2.081 | 2.090 | 2.097 |

FIG.26

| relationship | first embodiment | second embodiment | third embodiment | fourth embodiment | fifth embodiment |
|---|---|---|---|---|---|
| TTL/T4 | 6.696 | 6.697 | 6.691 | 6.699 | 6.700 |
| ALT/T3 | 3.301 | 3.383 | 3.589 | 3.598 | 3.515 |
| G23/T2 | 0.410 | 0.495 | 0.410 | 0.353 | 0.700 |
| G12/G34 | 2.843 | 2.800 | 2.980 | 3.132 | 2.020 |
| (T1+T4)/T2 | 3.165 | 3.110 | 3.155 | 3.149 | 3.150 |
| T2/T4 | 0.633 | 0.637 | 0.643 | 0.644 | 0.639 |
| T2/G34 | 3.922 | 4.000 | 4.000 | 3.792 | 4.000 |
| ALT/T4 | 3.782 | 3.717 | 3.704 | 3.702 | 3.706 |
| T1/T2 | 1.585 | 1.540 | 1.600 | 1.597 | 1.585 |
| T3/G12 | 2.497 | 2.464 | 2.154 | 1.934 | 3.267 |
| Gaa/G12 | 1.917 | 2.064 | 1.886 | 1.747 | 2.881 |
| G23/G34 | 1.608 | 1.980 | 1.640 | 1.340 | 2.800 |
| ALT/Gaa | 4.299 | 4.038 | 4.100 | 3.983 | 3.986 |
| T1/Gaa | 1.140 | 1.066 | 1.139 | 1.107 | 1.089 |
| (T1+T4)/Gaa | 2.277 | 2.152 | 2.246 | 2.183 | 2.165 |

FIG.27

IMAGING LENS, AND ELECTRONIC APPARATUS INCLUDING THE SAME

CROSS-REFERENCE TO RELATED APPLICATION

This application claims priority to Taiwanese Application No. 103138531, filed on Nov. 6, 2014.

FIELD OF THE INVENTION

The present disclosure relates to an imaging lens and an electronic apparatus including the same.

BACKGROUND OF THE INVENTION

In recent years, as portable electronic devices (e.g., mobile phones and digital cameras) become ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance. Imaging quality and size are two of the most important characteristics for an imaging lens.

Each of U.S. Pat. Nos. 7,692,877 and 8,325,269, Taiwan Patent No. 1320107 and Japan Patent Application Publication No. 2006-293324 discloses a conventional imaging lens that includes four lens elements. However, a system length of such kind of conventional imaging lenses is not reducible to be within a range that meets the thin product design requirements of mobile phones.

Therefore, greater technical difficulties are encountered for a miniaturized imaging lens than for traditional imaging lenses. Producing an imaging lens that meets the requirements of consumer electronic products while having satisfactory optical performance is always a goal in the industry.

SUMMARY OF THE INVENTION

An object of the present disclosure is to provide an imaging lens having a shorter overall length while maintaining good optical performance.

According to one aspect of the present disclosure, an imaging lens comprises an aperture stop, a first lens element, a second lens element, a third lens element and a fourth lens element arranged in order from an object side to an image side along an optical axis of the imaging lens. Each of the first lens element, the second lens element, the third lens element and the fourth lens element has a refractive power, an object-side surface facing toward the object side, and an image-side surface facing toward the image side.

The first lens element has a positive refractive power, the object-side surface of the first lens element has a convex portion in a vicinity of the optical axis and a convex portion in a vicinity of a periphery of the first lens element, and the image-side surface of the first lens element has a convex portion in a vicinity of the periphery of the first lens element.

The second lens has a negative refractive power, and the object-side surface of the second lens element has a concave portion in a vicinity of the optical axis and a concave portion in a vicinity of a periphery of the second lens element.

The third lens element has a positive refractive power, the object-side surface of the third lens element has a concave portion in a vicinity of a periphery of the third lens element, and the image-side surface of the third lens element has a convex portion in a vicinity of the optical axis and a convex portion in a vicinity of the periphery of the third lens element.

The fourth lens element has a negative refractive power, the object-side surface of the fourth lens element has a convex portion in a vicinity of the optical axis, and the image-side surface of the fourth lens element has a concave portion in a vicinity of the optical axis and a convex portion in a vicinity of a periphery of the fourth lens element.

The imaging lens does not include any lens element with a refractive power other than the first lens element, the second lens element, the third lens element and the fourth lens element.

The imaging lens satisfies $TTL/T4 \leq 6.7$ and $ALT/T3 \leq 3.6$, where TTL represents a distance between the object-side surface of the first lens element and an image plane at the optical axis, ALT represents a sum of thicknesses of the first lens element, the second lens element, the third lens element and the fourth lens element at the optical axis, T3 represents the thickness of the third lens element at the optical axis, and T4 represents the thickness of the fourth lens element at the optical axis.

Another object of the present disclosure is to provide an electronic apparatus having an imaging lens with four lens elements.

According to another aspect of the present disclosure, an electronic apparatus includes a housing and an imaging module. The imaging module is disposed in the housing, and includes the imaging lens of the present invention, a barrel on which the imaging lens is disposed, a holder unit on which the barrel is disposed, a substrate on which the holder unit is disposed, and an image sensor disposed on the substrate in location of the image side of the imaging lens.

BRIEF DESCRIPTION OF THE DRAWINGS

Other features and advantages of the present disclosure will become apparent in the following detailed description of the embodiments with reference to the accompanying drawings, of which:

FIG. 7 shows values of some optical data corresponding to the imaging lens of the first embodiment;

FIG. 8 shows values of some aspherical coefficients corresponding to the imaging lens of the first embodiment;

FIG. 11 shows values of some optical data corresponding to the imaging lens of the second embodiment;

FIG. 12 shows values of some aspherical coefficients corresponding to the imaging lens of the second embodiment;

FIG. 15 shows values of some optical data corresponding to the imaging lens of the third embodiment;

FIG. 16 shows values of some aspherical coefficients corresponding to the imaging lens of the third embodiment;

FIG. 19 shows values of some optical data corresponding to the imaging lens of the fourth embodiment;

FIG. 20 shows values of some aspherical coefficients corresponding to the imaging lens of the fourth embodiment;

FIG. 23 shows values of some optical data corresponding to the imaging lens of the fifth embodiment;

FIG. 24 shows values of some aspherical coefficients corresponding to the imaging lens of the fifth embodiment;

FIGS. 26 and 27 are tables that list values of relationships among some lens parameters corresponding to the imaging lenses of the first to fifth embodiments;

DETAILED DESCRIPTION OF THE EMBODIMENTS

Figure 2:
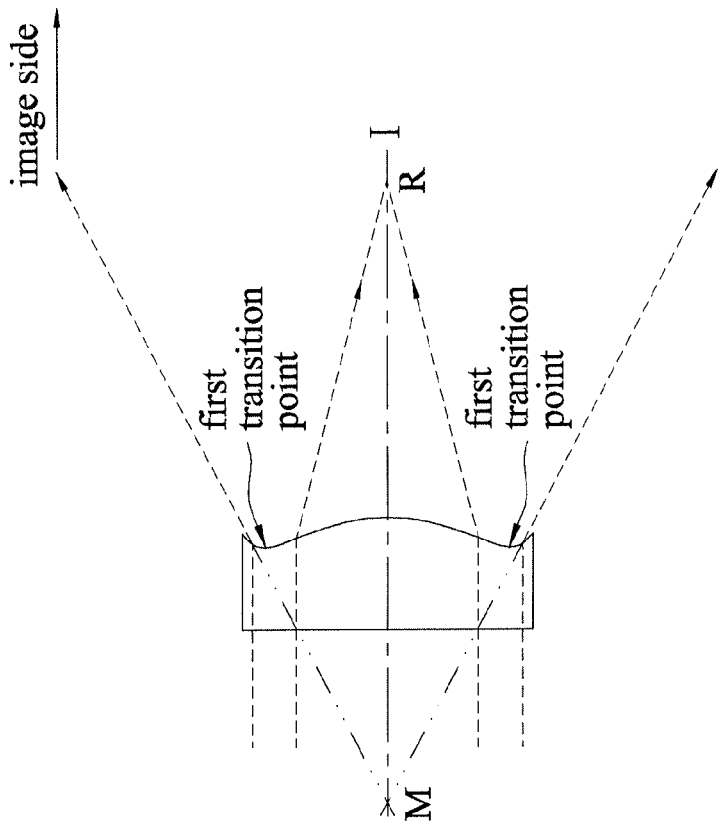
FIG. 2 is a schematic diagram to illustrate concave and convex portions and a focal point of a lens element.

Before the present disclosure is described in greater detail, it should be noted that like elements are denoted by the same reference numerals throughout the disclosure.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element through which imaging rays are capable of passing, namely the clear aperture of the surface. The aforementioned imaging rays can be classified into two types, chief rays (Lc) and marginal rays (Lm). Taking a lens element depicted in FIG. 1 as an example, the lens element is rotationally symmetric, where the optical axis (I) is the axis of symmetry. The region (A) of the lens element is defined as "a portion in a vicinity of the optical axis (I)", and the region (C) of the lens element is defined as "a portion in a vicinity of a periphery of the lens element". Besides, the lens element may also have an extending portion (E) extended radially and outwardly from the region (C), namely the portion outside of the clear aperture of the lens element. The extending portion (E) is usually used for physically assembling the lens element into an optical imaging lens system. Under normal circumstances, the imaging rays would not pass through the extending portion (E) and only pass through the clear aperture. The structures and shapes of the aforementioned extending portion (E) are only examples for technical explanation, and the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in the vicinity of the optical axis (I), the portion in the vicinity of the periphery of a lens element surface, and other types of lens element surfaces such as those having multiple portions.

Figure 1:
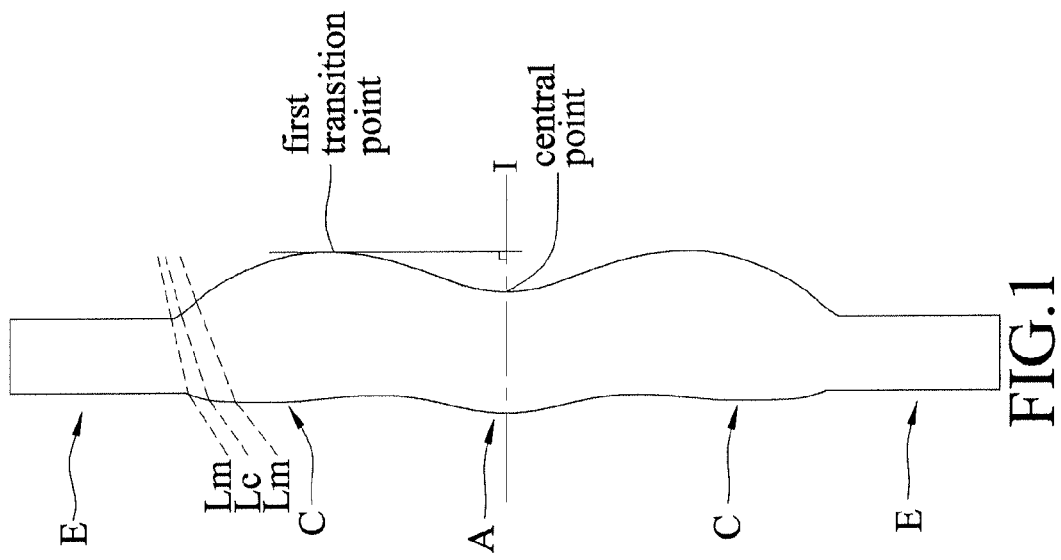
FIG. 1 is a schematic diagram to illustrate surface shape and structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis (I). The transition point is a point on a surface of a lens element, where the tangent line of that point is perpendicular to the optical axis (I). Additionally, if multiple transition points appear on one single surface, then these transition points are sequentially named along the radial direction of the surface with numbers starting from the first transition point. For instance, these transition points may be the first transition point (closest one to the optical axis (I)), the second transition point, . . . and the $N^{th}$ transition point (the farthest one from the optical axis (I) within the scope of the clear aperture of the surface). The portion of a surface of a lens element between the central point and the first transition point is defined as the portion in the vicinity of the optical axis (I). The portion located radially outside of the $N^{th}$ transition point (but still within the scope of the clear aperture) is defined as the portion in the vicinity of the periphery of the lens element. In some embodiments, there are other portions existing between the portion in the vicinity of the optical axis (I) and the portion in the vicinity of the periphery of the lens element; the number of portions depend on the number of the transition point(s). In addition, the radius of the clear aperture (or a so-called effective radius) of a surface is defined as the radial distance from the optical axis (I) to a point of intersection of the marginal ray (Lm) and the surface of the lens element.

2. Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bent and the ray itself or its extension line will eventually meet the optical axis (I). The shape of that portion can be determined by whether the ray or its extension line meets (intersects) the optical axis (I) (focal point) at the object-side or image-side. For instance, if the ray itself intersects the optical axis (I) at the image side of the lens element after passing through a portion, i.e., the focal point of this ray is at the image side (see point R in FIG. 2), the portion will be determined as having a convex shape. On the contrary, if the ray diverges after passing through a portion, and the extension line of the ray intersects the optical axis (I) at the object side of the lens element, i.e., the focal point of the ray is at the object side (see point (M) in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent with that by using the other way mentioned above, which determines surface shapes by referring to whether the focal point of a collimated ray is at the object side or the image side.

3. For none transition point cases, the portion in the vicinity of the optical axis is defined as the portion between 0~50% of the effective radius (radius of the clear aperture) of the surface, whereas the portion in the vicinity of the periphery of the lens element is defined as the portion between 50~100% of the effective radius (the radius of the clear aperture) of the surface.

Figure 3:
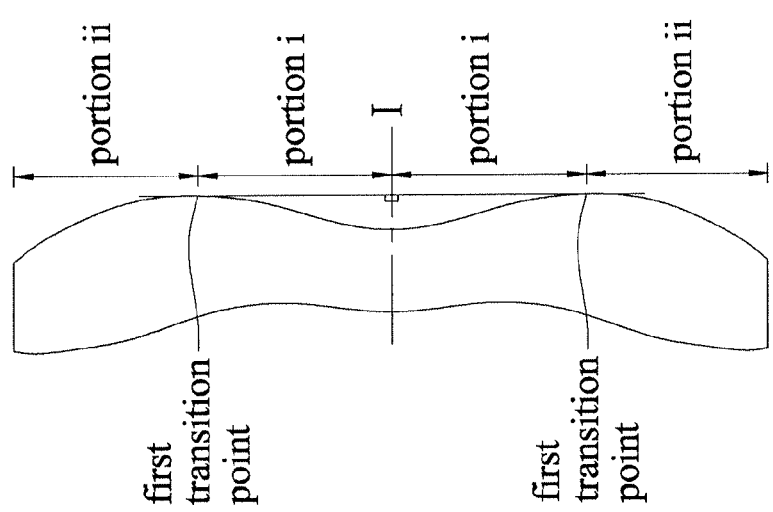
FIG. 3 is a schematic diagram to illustrate surface shape and structure of a first exemplary lens element.

Referring to the first example depicted in FIG. 3, only one transition point, namely a first transition point, appears within the clear aperture of the image-side surface of the lens element. Portion (i) is a portion in the vicinity of the optical axis, and portion (ii) is a portion in the vicinity of the periphery of the lens element. The portion in the vicinity of the optical axis (I) is determined as having a concave surface due to the R value at the image-side surface of the lens element being positive. The shape of the portion in the vicinity of the periphery of the lens element is different from that of the radially inner adjacent portion, i.e., the shape of the portion in the vicinity of the periphery of the lens element is different from the shape of the portion in the vicinity of the optical axis (I); the portion in the vicinity of the periphery of the lens element has a convex shape.

Figure 4:
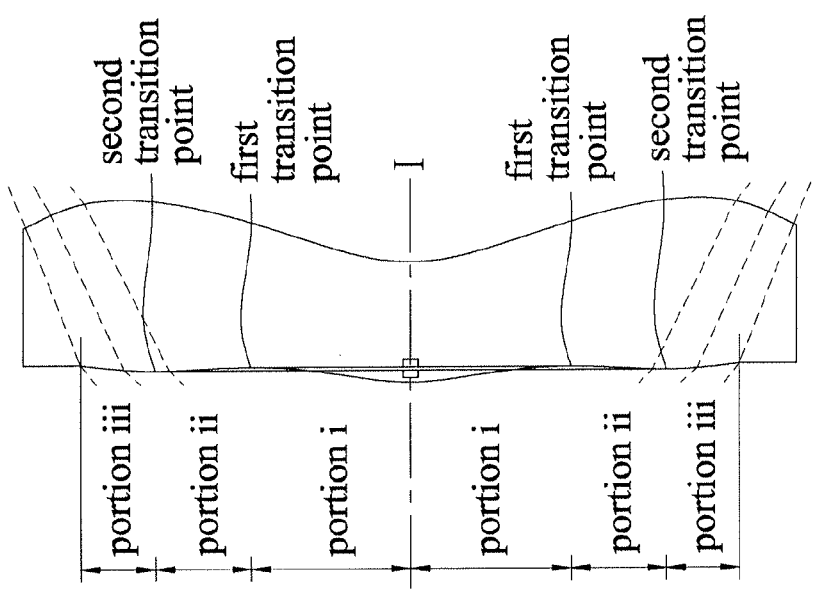
FIG. 4 is a schematic diagram to illustrate surface shape and structure of a second exemplary lens element.

Referring to the second example depicted in FIG. 4, a first transition point and a second transition point exist on the object-side surface (within the clear aperture) of a lens element. In the second example, portion (i) is the portion in the vicinity of the optical axis (I), and portion (iii) is the portion in the vicinity of the periphery of the lens element. The portion in the vicinity of the optical axis (I) has a convex shape because the R value at the object-side surface of the lens element is positive. The portion in the vicinity of the periphery of the lens element (portion iii) has a convex shape. Furthermore, there is another portion having a concave shape existing between the first and second transition points (portion (ii)).

Figure 5:
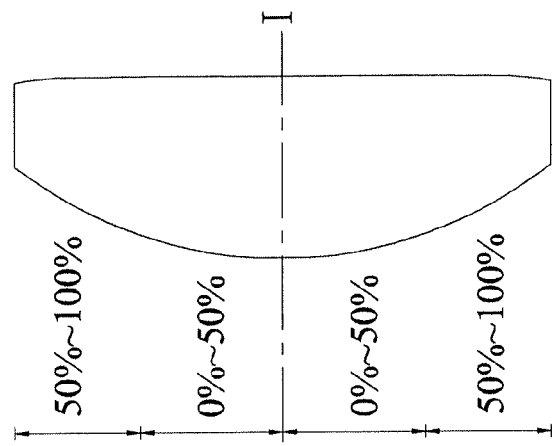
FIG. 5 is a schematic diagram to illustrate surface shape and structure of a third exemplary lens element.

Referring to a third example depicted in FIG. 5, no transition point exists on the object-side surface of the lens element. In this case, the portion between 0~50% of the effective radius (the radius of the clear aperture) is determined as the portion in the vicinity of the optical axis (I), and the portion between 50~100% of the effective radius is determined as the portion in the vicinity of the periphery of the lens element. The portion in the vicinity of the optical axis (I) of the object-side surface of the lens element is determined as having a convex shape due to its positive R value, and the portion in the vicinity of the periphery of the lens element is determined as having a convex shape as well.

Figure 6:
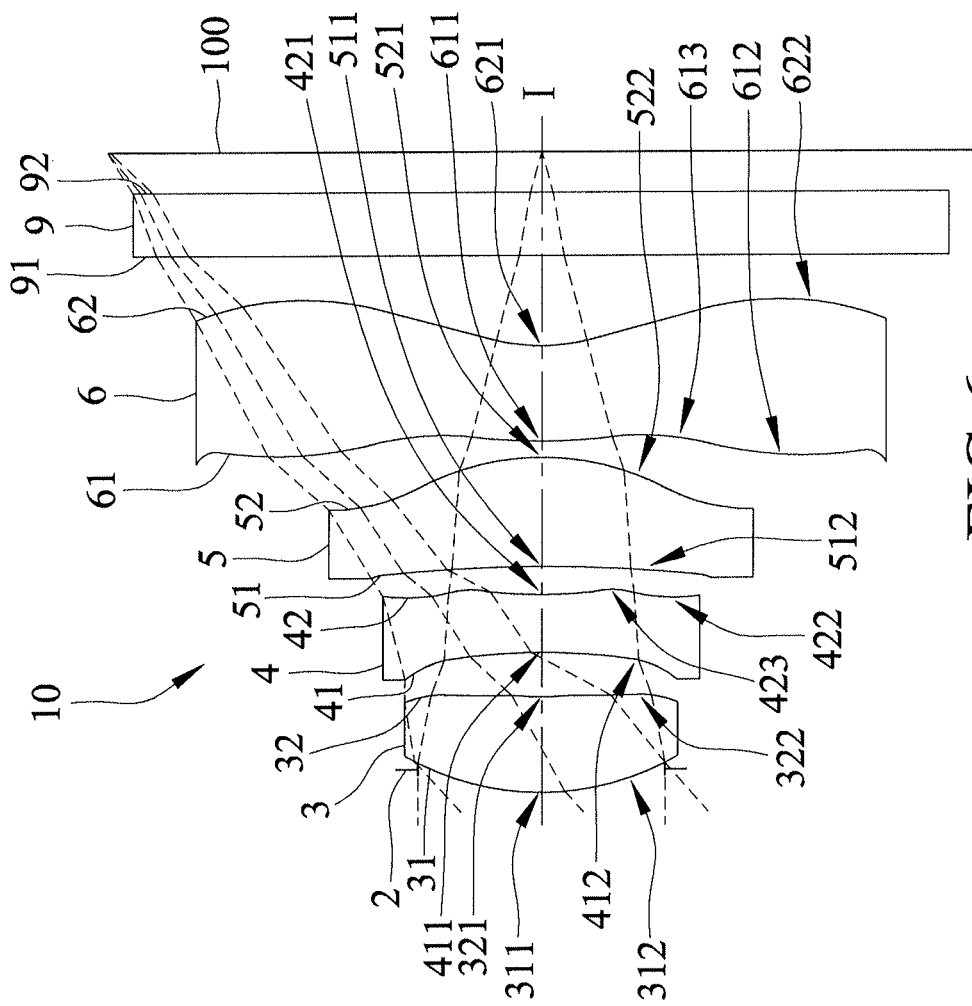
FIG. 6 is a schematic diagram that illustrates the first embodiment of an imaging lens according to the present disclosure.

Referring to FIG. 6, the first embodiment of an imaging lens 10 according to the present disclosure includes an aperture stop 2, a first lens element 3, a second lens element 4, a third lens element 5, a fourth lens element 6 and an optical filter 9 arranged in the given order along an optical axis (I) from an object side to an image side. The optical filter 9 is an infrared cut filter for selectively absorbing infrared light to thereby reduce imperfection of images formed at an image plane 100.

Each of the first, second, third and fourth lens elements 3-6 and the optical filter 9 has an object-side surface 31, 41, 51, 61, 91 facing toward the object side, and an image-side surface 32, 42, 52, 62, 92 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 91, 92 of the optical filter 9, in the given order, to form an image on the image plane 100. Each of the Object-side surfaces 31, 41, 51, 61, and the image-side surfaces 32, 42, 52, 62, is aspherical and has a center point coinciding with the optical axis (I).

The lens elements 3-6 are made of a plastic material in this embodiment, and at least one of the lens elements 3-6 may be made of other materials in other embodiments. In addition, each of the lens elements 3-6 has a refractive power.

In the first embodiment, which is depicted in FIG. 6, the first lens element 3 has a positive refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 is a concave surface that has a concave portion 411 in a vicinity of the optical axis (I), and a concave portion 412 in a vicinity of a periphery of the second lens element 4. The image-side surface 42 of the second lens element 4 has a concave portion 421 in a vicinity of the optical axis (I), a concave portion 422 in a vicinity of the periphery of the second lens element 4, and a convex portion 423 disposed between the concave portions 421, 422.

The third lens element 5 has a positive refractive power. The object-side surface 51 of the third lens element 5 is a concave surface that has a concave portion 511 in a vicinity of the optical axis (I), and a concave portion 512 in a vicinity of a periphery of the third lens element 5. The image-side surface 52 of the third lens element 5 is a convex surface that has a convex portion 521 in a vicinity of the optical axis (I), and a convex portion 522 in a vicinity of the periphery of the third lens element 5.

The fourth lens element 6 has a negative refractive power. The object-side surface 61 of the fourth lens element 6 has a convex portion 611 in a vicinity of the optical axis (I), a convex portion 612 in a vicinity of a periphery of the fourth lens element 6, and a concave portion 613 disposed between the convex portions 611, 612. The image-side surface 62 of the fourth lens element 6 has a concave portion 621 in a vicinity of the optical axis (I), and a convex portion 622 in a vicinity of the periphery of the fourth lens element 6.

In the first embodiment, the imaging lens 10 does not include any lens element with a refractive power other than the aforesaid lens elements 3-6.

Shown in FIG. 7 is a table that lists values of some optical data corresponding to the surfaces 31, 41, 51, 61, 91, 32, 42, 52, 62, and 92 of the first embodiment. The imaging lens 10 has an overall system effective focal length (EFL) of 1.563 mm, a half field-of-view (HFOV) of 39.927°, an F-number of 2.056, and a system length (TTL) of 2.116 mm. TTL refers to a distance between the object-side surface 31 of the first lens element 3 and the image plane 100 at the optical axis (I).

In this embodiment, each of the object-side surfaces 31, 41, 51, and 61 and the image-side surfaces 32, 42, 52, and 62 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and a2i represents an 2ith aspherical coefficient.

Shown in FIG. 8 is a table that lists values of some aspherical coefficients of the aforementioned relationship (1) corresponding to the first embodiment. Each of the columns numbered 31, 41, 51, and 61 and 32, 42, 52, and 62 in FIG. 8 lists the aspherical coefficients of a respective one of the object-side surfaces 31, 41, 51, and 61 and the image-side surfaces 32, 42, 52, and 62.

Relationships among some of the lens parameters corresponding to the first embodiment are listed in columns of FIGS. 26 and 27 corresponding to the first embodiment. Note that some terminologies are defined as follows:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

Gaa represents a sum of the three air gap lengths among the first lens element 3, the second lens element 4, the third lens element 5 and the fourth lens element 6 at the optical axis (I), i.e., the sum of G12, G23 and G34;

ALT represents a sum of the thicknesses of the lens elements 3-6 at the optical axis (I), i.e., the sum of T1, T2, T3 and T4;

BFL represents a distance at the optical axis (I) between the image-side surface 62 of the fourth lens element 6 and the image plane 100;

G4F represents an air gap length between the fourth lens element 6 and the optical filter 9 at the optical axis (I);

TF represents a thickness of the optical filter 9 at the optical axis (I); and

GFP represents an air gap length between the optical filter 9 and the image plane 100 at the optical axis (I).

In addition, some referenced terminologies are defined herein, where:

f1 represents a focal length of the first lens element 3;

f2 represents a focal length of the second lens element 4;

f3 represents a focal length of the third lens element 5;

f4 represents a focal length of the fourth lens element 6;

n1 represents a refractive index of the first lens element 3;

n2 represents a refractive index of the second lens element 4;

n3 represents a refractive index of the third lens element 5;

n4 represents a refractive index of the fourth lens element 6;

ν1 is an Abbe number of the first lens element 3;

ν2 is an Abbe number of the second lens element 4;

ν3 is an Abbe number of the third lens element 5; and

ν4 is an Abbe number of the fourth lens element 6.

FIGS. 9(A) to 9(D) respectively show simulation results corresponding to longitudinal spherical aberration, sagittal astigmatism aberration, tangential astigmatism aberration, and distortion aberration of the first embodiment. In each of the simulation results, curves corresponding respectively to wavelengths of 470 nm, 555 nm, and 650 nm are shown.

Figure 9:
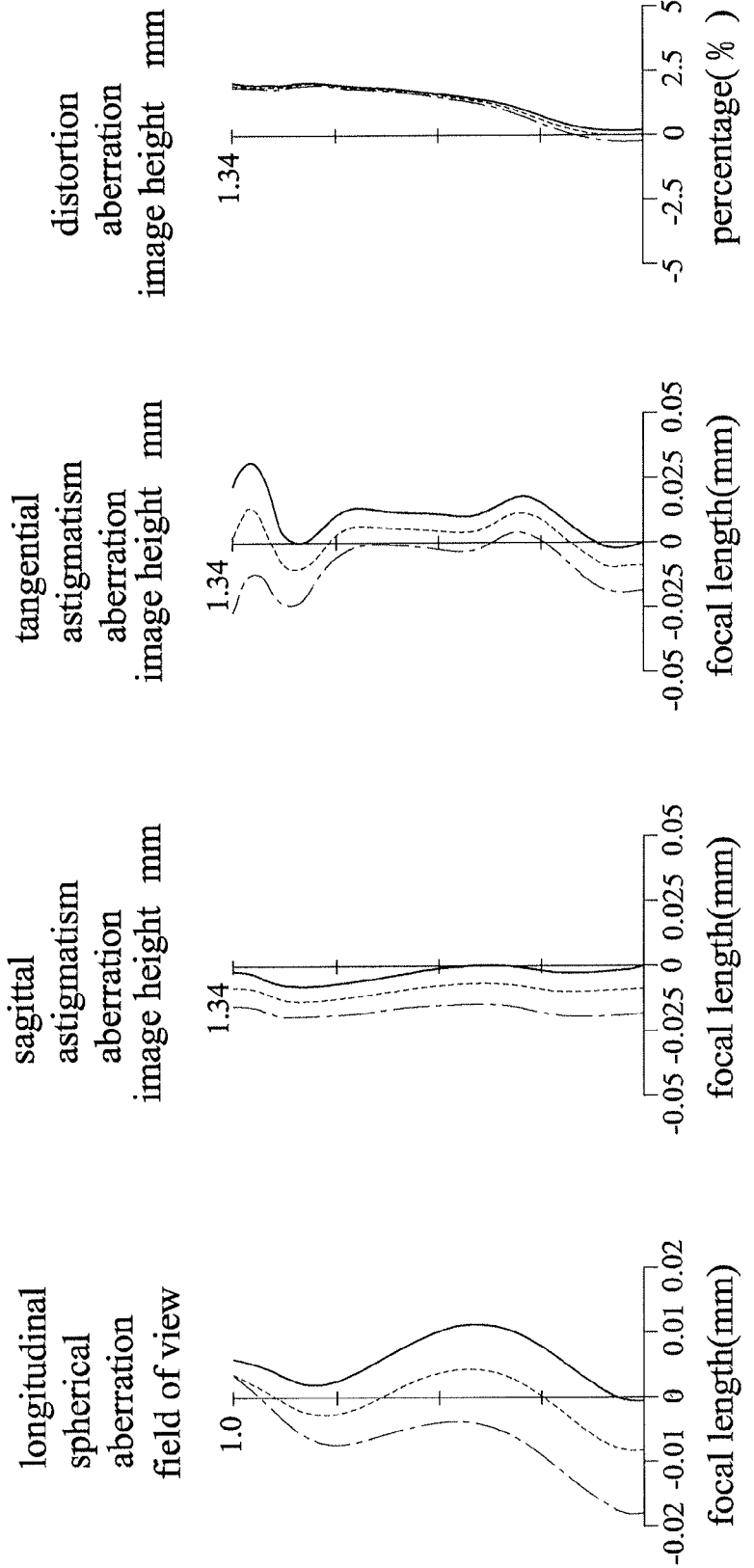
FIGS. 9(A) to 9(D) show different optical characteristics of the imaging lens of the first embodiment.

It can be understood from FIG. 9(A) that, since each of the curves corresponding to longitudinal spherical aberration has a focal length at each field of view (indicated by the vertical axis) that falls within the range of ±0.02 mm, the first embodiment is able to achieve a relatively low spherical aberration at each of the wavelengths. Furthermore, since the curves at each of the wavelengths of 470 nm, 555 nm, and 650 nm are close to each other, the first embodiment has a relatively low chromatic aberration.

It can be understood from FIGS. 9(B) and 9(C) that, since each of the curves falls within the range of ±0.05 mm of focal length, the first embodiment has a relatively low optical aberration.

Moreover, as shown in FIG. 9(D), since each of the curves corresponding to distortion aberration falls within the range of ±2.5%, the first embodiment is able to meet requirements in imaging quality of most optical systems.

In view of the above, even with the system length reduced down to below 2.2 mm, the imaging lens 10 of the first embodiment is still able to achieve a relatively good optical performance. Therefore, the imaging lens 10 of the first embodiment may suit a thinner product design by virtue of a shorter system length and a wider image-capturing angle while maintaining relatively good optical performance.

Figure 10:
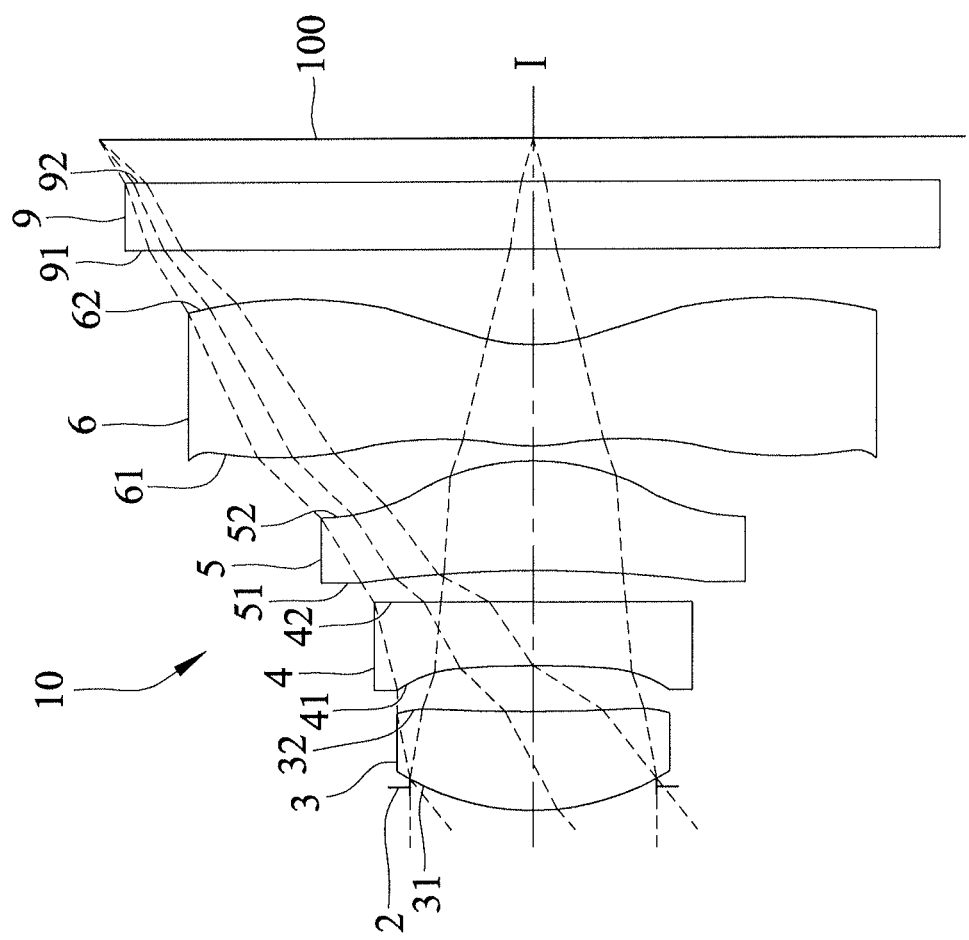
FIG. 10 is a schematic diagram that illustrates the second embodiment of an imaging lens according to the present disclosure.
Figure 13:
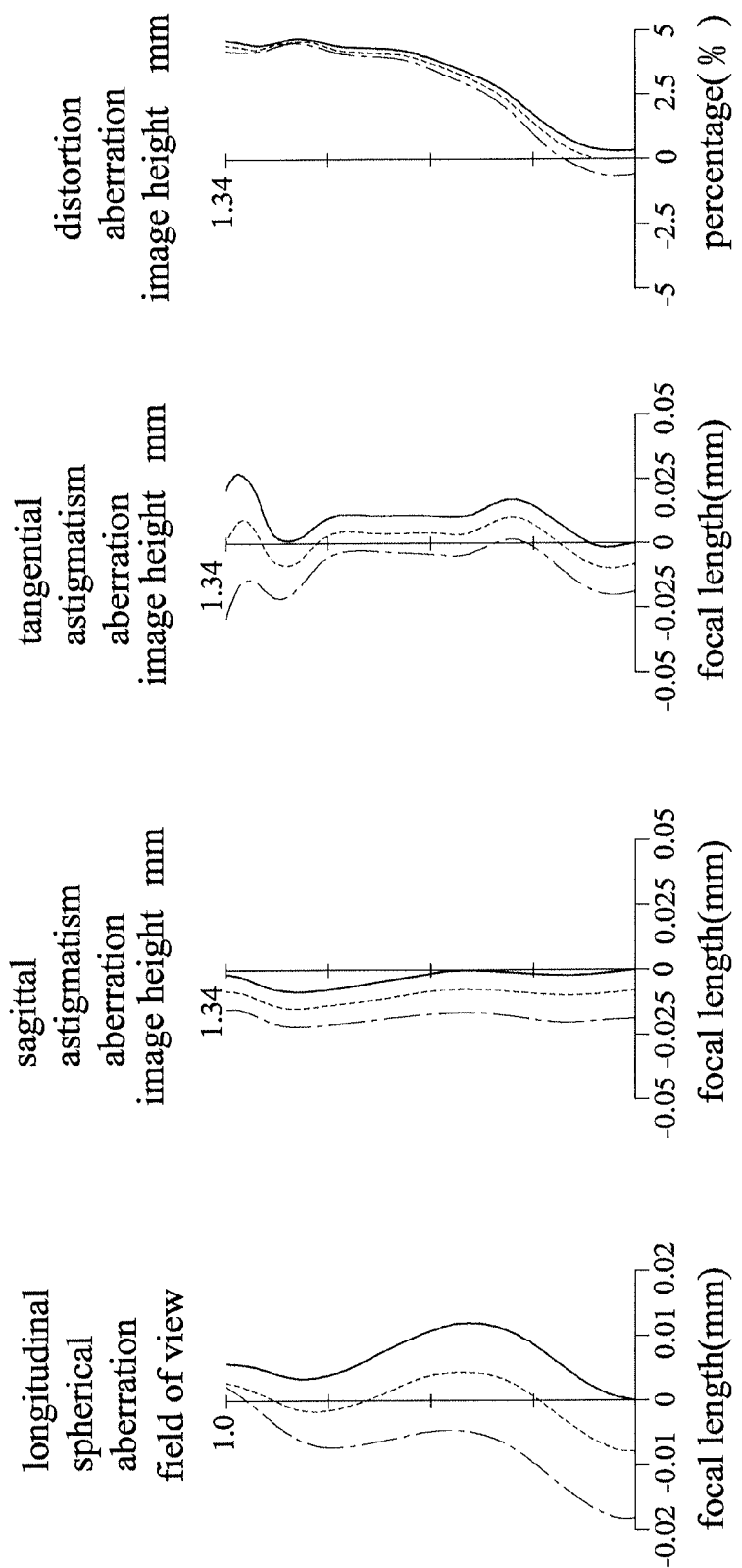
FIGS. 13(A) to 13(D) show different optical characteristics of the imaging lens of the second embodiment.

FIG. 10 illustrates the second embodiment of an imaging lens 10 according to the present disclosure, which has a configuration similar to that of the first embodiment. The differences between the first and second embodiments of the imaging lens 10 of this disclosure reside in some of the optical data, the aspherical coefficients and the lens parameters of the lens elements 3-6. In FIG. 10, the reference numerals of the concave portions and the convex portions that are the same as those of the first embodiment are omitted for the sake of clarity.

Shown in FIG. 11 is a table that lists values of some optical data corresponding to the surfaces 31, 41, 51, 61, 91, 32, 42, 52, 62, and 92 of the second embodiment. The imaging lens 10 has an overall system focal length of 1.558 mm, an HFOV of 40.079° an F-number of 2.056, and a system length of 2.104 mm.

Shown in FIG. 12 is a table that lists values of some aspherical coefficients of the aforementioned relationship (1) corresponding to the second embodiment.

Relationships among some of the aforementioned lens parameters corresponding to the second embodiment are listed in columns of FIGS. 26 and 27 corresponding to the second embodiment.

FIGS. 13(A) to 13(D) respectively show simulation results corresponding to longitudinal spherical aberration, sagittal astigmatism aberration, tangential astigmatism aberration, and distortion aberration of the second embodiment. It can be understood from FIGS. 13(A) to 13(D) that the second embodiment is able to achieve a relatively good optical performance.

In comparison to the first embodiment, the second embodiment has a shorter TTL, a wider HFOV, and may have a higher yield rate since the second embodiment is relatively easier to fabricate.

Figure 14:
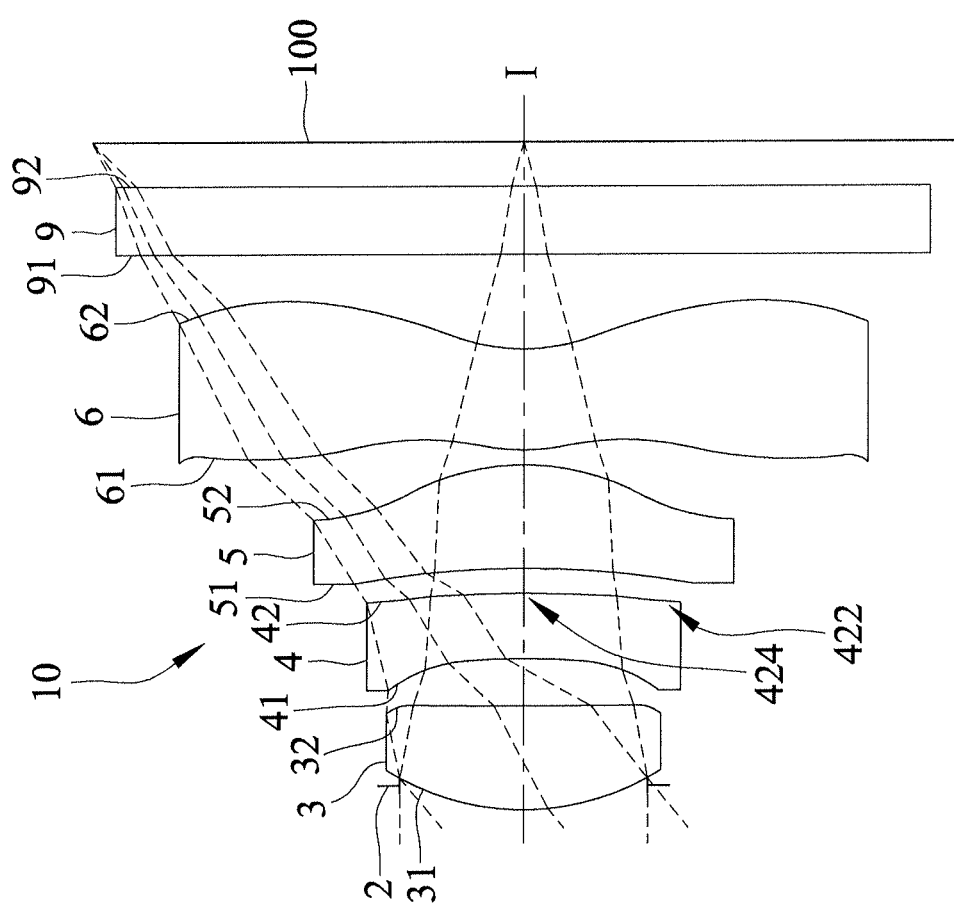
FIG. 14 is a schematic diagram that illustrates the third embodiment of an imaging lens according to the present disclosure.
Figures 17A, 17B, 17C, 17D:
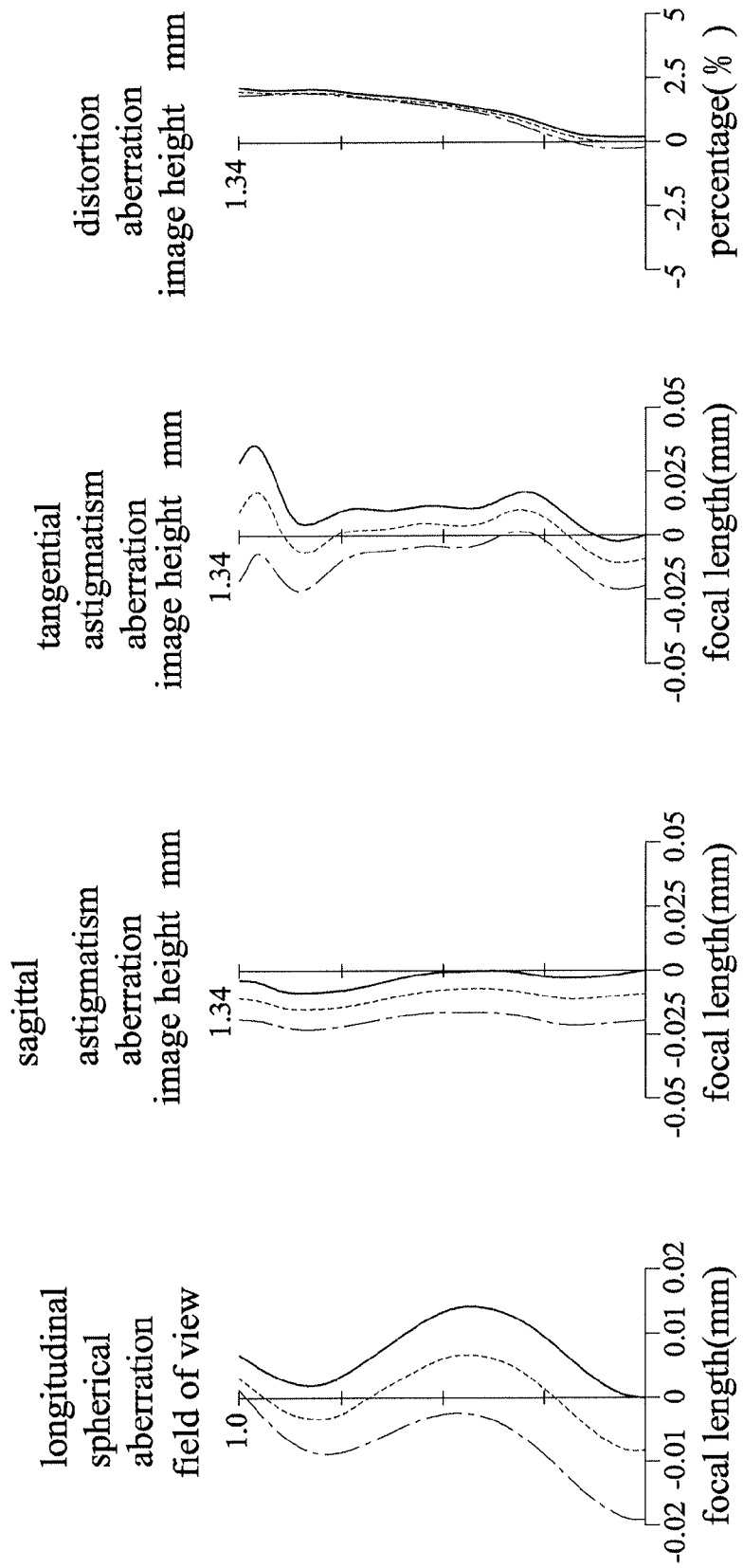
FIGS. 17(A) to 17(D) show different optical characteristics of the imaging lens of the third embodiment.

FIG. 14 illustrates the third embodiment of an imaging lens 10 according to the present disclosure, which has a configuration similar to that of the first embodiment. The differences between the first and third embodiments of the imaging lens 10 of this disclosure reside in some of the optical data, the aspherical coefficients and the lens parameters of the lens elements 3-6. Furthermore, in the third embodiment, the image-side surface 42 of the second lens element 4 has a convex portion 424 in a vicinity of the optical axis (I) and a concave portion 422 in a vicinity of the periphery of the second lens element 4. In FIG. 14, the reference numerals of the concave portions and the convex portions that are the same as those of the first embodiment are omitted for the sake of clarity.

Shown in FIG. 15 is a table that lists values of some optical data corresponding to the surfaces 31, 41, 51, 61, 91, 32, 42, 52, 62, and 92 of the third embodiment. The imaging lens 10 has an overall system focal length of 1.539 mm, an HFOV of 40.345°, an F-number of 2.056, and a system length of 2.081 mm.

Shown in FIG. 16 is a table that lists values of some aspherical coefficients of the aforementioned relationship (1) corresponding to the third embodiment.

Relationships among some of the aforementioned lens parameters corresponding to the third embodiment are listed in columns of FIGS. 26 and 27 corresponding to the third embodiment.

FIGS. 17(A) to 17(D) respectively show simulation results corresponding to longitudinal spherical aberration, sagittal astigmatism aberration, tangential astigmatism aberration, and distortion aberration of the third embodiment. It can be understood from FIGS. 17(A) to 17(D) that the third embodiment is able to achieve a relatively good optical performance.

In comparison to the first embodiment, the third embodiment has a shorter TTL, a wider HFOV, and may have a higher yield rate since the third embodiment is relatively easier to fabricate.

Figure 18:
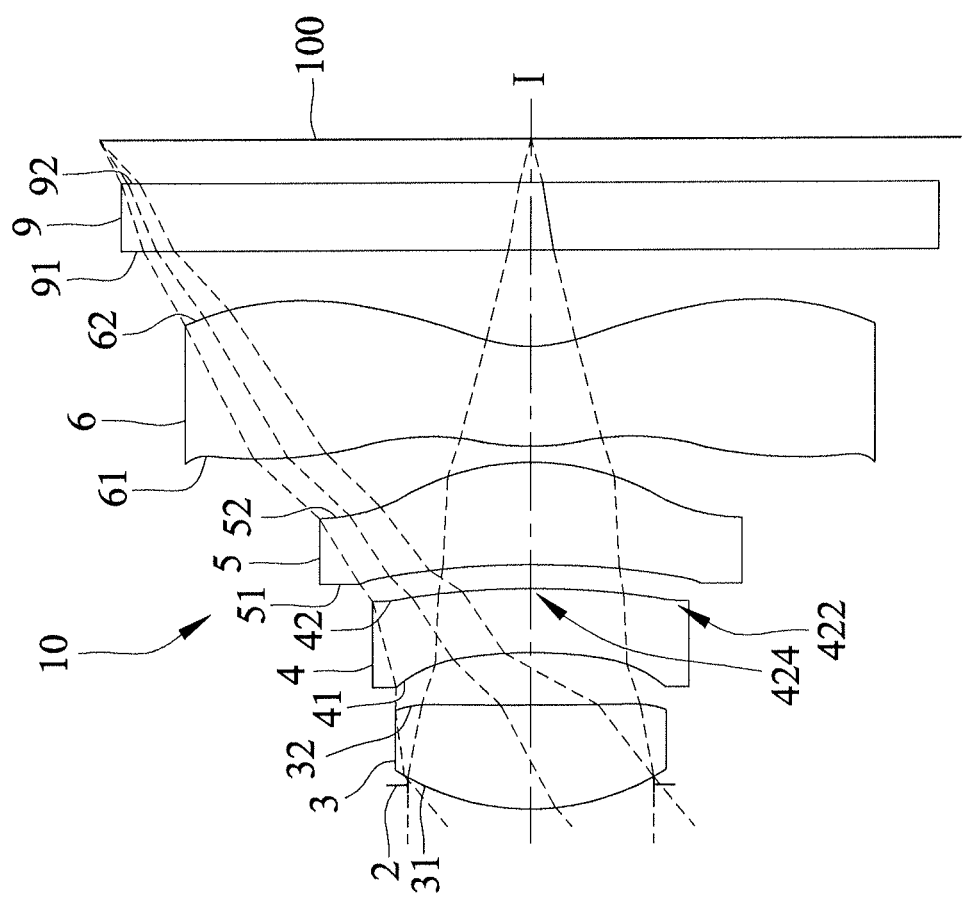
FIG. 18 is a schematic diagram that illustrates the fourth embodiment of an imaging lens according to the present disclosure.
Figures 21A, 21B, 21C, 21D:
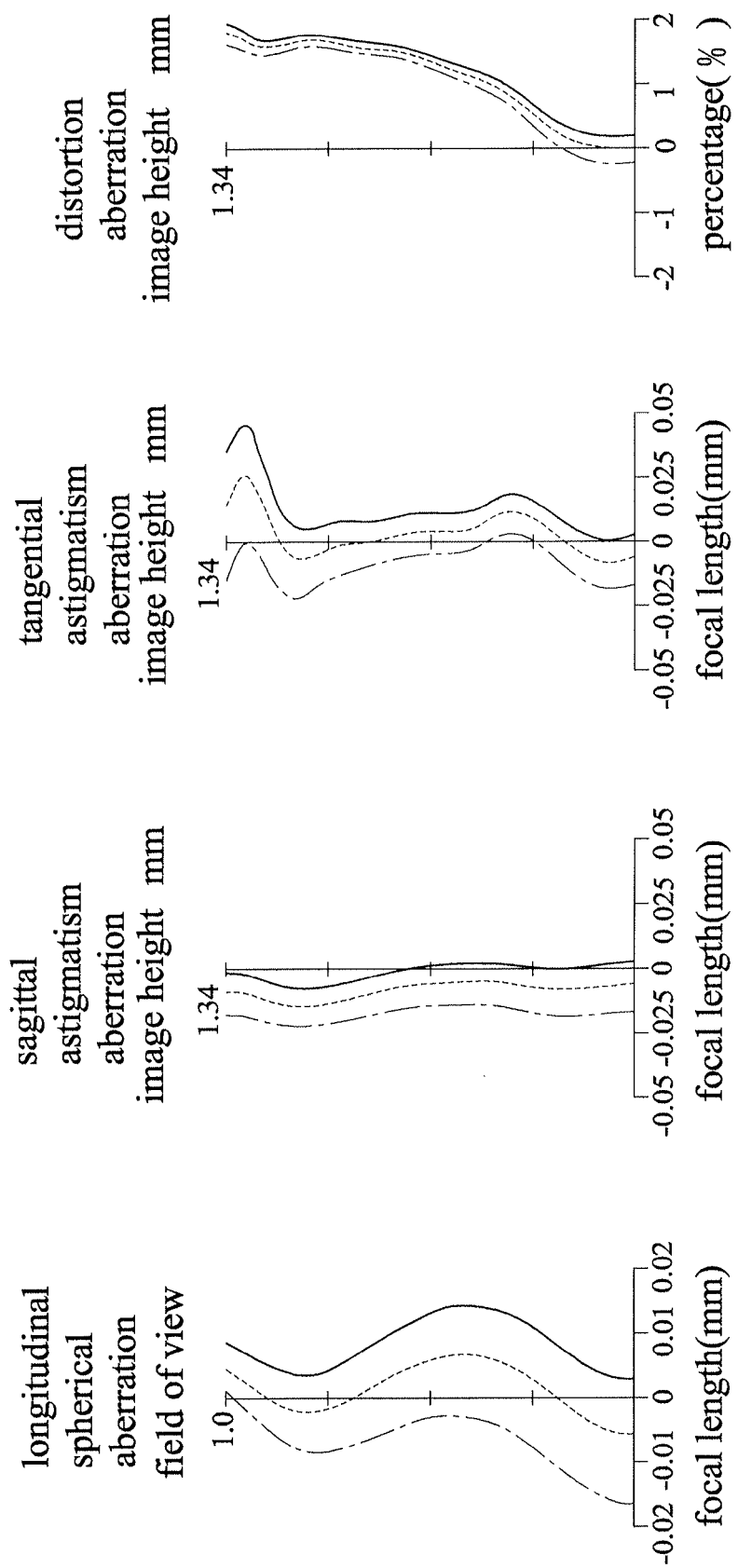
FIGS. 21(A) to 21(D) show different optical characteristics of the imaging lens of the fourth embodiment.

FIG. 18 illustrates the fourth embodiment of an imaging lens 10 according to the present disclosure, which has a configuration similar to that of the first embodiment. The differences between the first and fourth embodiments of the imaging lens 10 of this disclosure reside in some of the optical data, the aspherical coefficients and the lens parameters of the lens elements 3-6. Furthermore, in the fourth embodiment, the image-side surface 42 of the second lens element 4 has a convex portion 424 in a vicinity of the optical axis (I) and a concave portion 422 in a vicinity of the periphery of the second lens element 4. In FIG. 18, the reference numerals of the concave portions and the convex portions that are the same as those of the first embodiment are omitted for the sake of clarity.

Shown in FIG. 19 is a table that lists values of some optical data corresponding to the surfaces 31, 41, 51, 61, 91, 32, 42, 52, 62, and 92 of the fourth embodiment. The imaging lens 10 has an overall system focal length of 1.548 mm, an HFOV of 40.295°, an F-number of 2.056, and a system length of 2.090 mm.

Shown in FIG. 20 is a table that lists values of some aspherical coefficients of the aforementioned relationship (1) corresponding to the fourth embodiment.

Relationships among some of the aforementioned lens parameters corresponding to the fourth embodiment are listed in columns of FIGS. 26 and 27 corresponding to the fourth embodiment.

FIGS. 21(A) to 21(D) respectively show simulation results corresponding to longitudinal spherical aberration, sagittal astigmatism aberration, tangential astigmatism aberration, and distortion aberration of the fourth embodiment. It can be understood from FIGS. 21(A) to 21(D) that the fourth embodiment is able to achieve a relatively good optical performance.

In comparison to the first embodiment, the fourth embodiment has a shorter TTL, a wider HFOV, and may have a higher yield rate since the fourth embodiment is relatively easier to fabricate.

Figure 22:
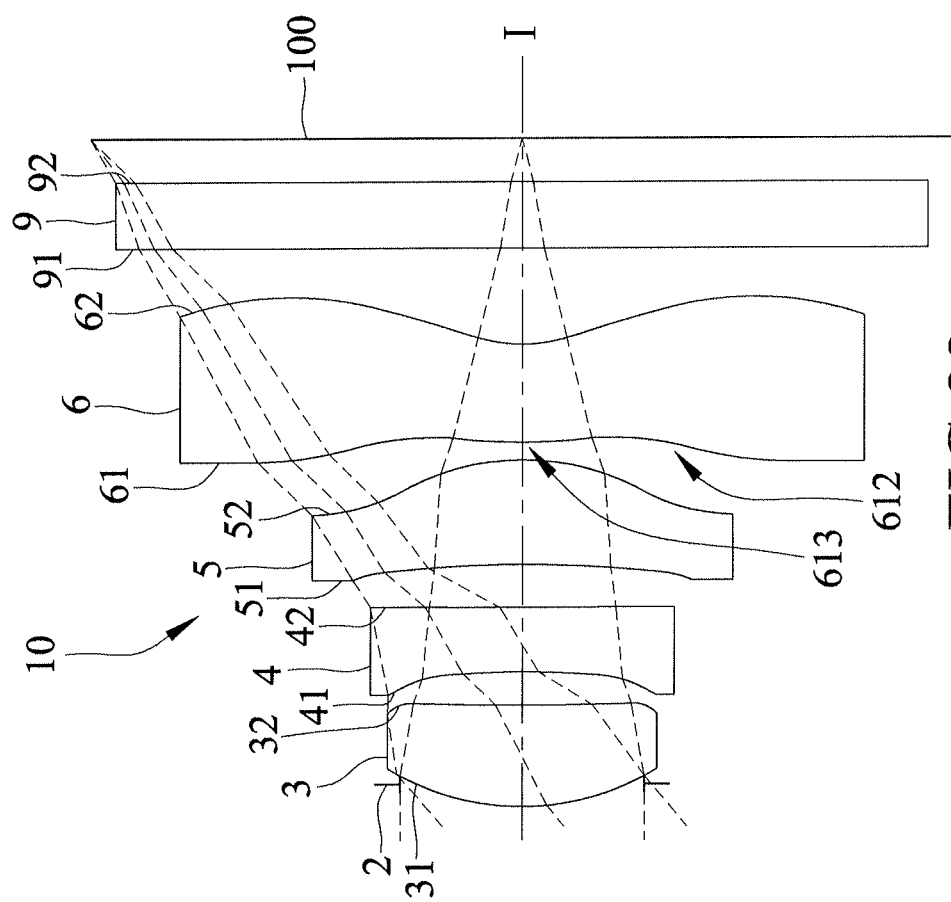
FIG. 22 is a schematic diagram that illustrates the fifth embodiment of an imaging lens according to the present disclosure.
Figures 25A, 25B, 25C, 25D:
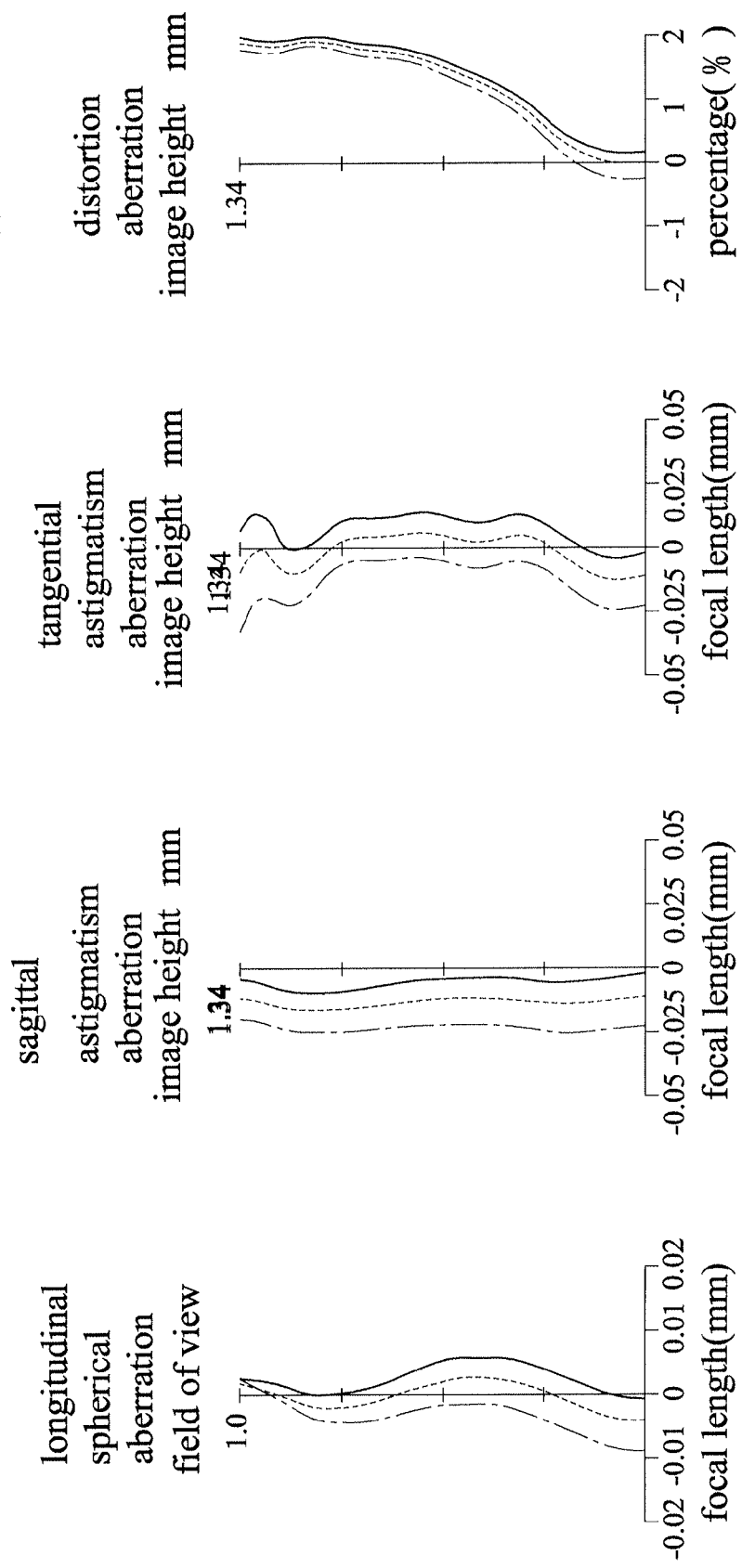
FIGS. 25(A) to 25(D) show different optical characteristics of the imaging lens of the fifth embodiment.

FIG. 22 illustrates the fifth embodiment of an imaging lens 10 according to the present disclosure, which has a configuration similar to that of the first embodiment. The differences between the first and fifth embodiments of the imaging lens 10 of this disclosure reside in some of the optical data, the aspherical coefficients and the lens parameters of the lens elements 3-6. Furthermore, in the fifth embodiment, the object-side surface 61 of the fourth lens element 6 has a convex portion 613 in a vicinity of the optical axis (I) and a concave portion 612 in a vicinity of the periphery of the fourth lens element 6. In FIG. 22, the reference numerals of the concave portions and the convex portions that are the same as those of the first embodiment are omitted for the sake of clarity.

Shown in FIG. 23 is a table that lists values of some optical data corresponding to the surfaces 31, 41, 51, 61, 91, 32, 42, 52, 62, and 92 of the fifth embodiment. The imaging lens 10 has an overall system focal length of 1.563 mm, an HFOV of 39.895°, an F-number of 2.056, and a system length of 2.097 mm.

Shown in FIG. 24 is a table that lists values of some aspherical coefficients of the aforementioned relationship (1) corresponding to the fifth embodiment.

Relationships among some of the aforementioned lens parameters corresponding to the fifth embodiment are listed in columns of FIGS. 26 and 27 corresponding to the fifth embodiment.

FIGS. 25(A) to 25(D) respectively show simulation results corresponding to longitudinal spherical aberration, sagittal astigmatism aberration, tangential astigmatism aberration, and distortion aberration of the fifth embodiment. It can be understood from FIGS. 25(A) to 25(D) that the fifth embodiment is able to achieve a relatively good optical performance.

In comparison to the first embodiment, the fifth embodiment has a shorter TTL, and may have a higher yield rate since the fifth embodiment is relatively easier to fabricate.

Shown in FIGS. 26 and 27 are tables that list the aforesaid relationships among some of the aforementioned lens parameters corresponding to the five embodiments for comparison. When each of the lens parameters of the imaging lens 10 according to this disclosure satisfies the following optical relationships, the optical performance is still relatively good even with the reduced system length:

(1) Through value control of parameters, TTL/T4≤6.7 is suggested. Since the fourth lens element 6 has a relatively larger optical effective diameter among the lens elements 3-6, reduction in T4 in thereby limited. In consideration to lens fabrication techniques, when TTL of the imaging lens 10 is reduced, TTL/T4 should tend to be small. However, while the thicknesses of the lens elements and the air gap lengths are reduced, ratios thereamong should be proper to prevent any one of them from being excessively large, which may otherwise adversely affect the overall thickness reduction of the imaging lens 10, or to prevent any one of them from being excessively small, which may otherwise cause difficulty in assembly. In some embodiments, TTL/T4 may be further defined as 4.5≤TTL/T4≤6.7. Specifically, TTL/T4 may be defined as 6.4≤TTL/T4≤6.7.

(2) Through value control of parameters, ALT/T3≤6 is suggested. Since the third lens element 5 has the positive refractive power and the convex portion 521 in a vicinity of the optical axis (I), thicker T3 may be advantageous for light entering the third lens element 5 to travel out of the third lens element 5 at an appropriate height, thereby enhancing imaging quality. In addition, since reduction in ALT is advantageous for reducing the system length of the imaging lens 10, ALT/T3 should tend to be small and be maintained in appropriate ratio, thereby preventing any one of the parameters from being excessively large, which may otherwise adversely affect the overall thickness reduction of the imaging lens 10, or preventing any one of them from being excessively small, which may otherwise cause difficulty in assembly. In some embodiments, ALT/T3 may be further defined as 2.6≤ALT/T3≤3.6. Specifically, ALT/T3 may be defined as 3.1≤ALT/T3≤3.6.

(3) Through value control of parameters, G12/G34≤4.5 and/or T2/G34≤4.0 are suggested. Since excessively small G34 is adverse to assembly of the imaging lens 10, reduction in G34 is thereby limited. On the other hand, reductions in G12 and T2 are advantageous for thin design of the imaging lens 10, so that G12/G34 and T2/G34 should tend to be small. However, while the thicknesses of the lens elements and the air gap lengths are reduced, ratios thereamong should be proper to prevent any one of them from being excessively large, which may otherwise adversely affect the overall thickness reduction of the imaging lens 10, or to prevent any one of them from being excessively small, which may otherwise cause difficulty in assembly. In some embodiments, G12/G34 and T2/G34 may be further respectively defined as 1.8≤G1.2/G34≤4.5 and 3.5≤T2/G34≤4.0.

(4) Through value control of parameters, G23/T2≥0.3 and/or G23/G34≥1.1 are suggested. Since excessively small G23 is adverse to assembly of the imaging lens 10, reduction in G23 is thereby limited. In comparison to G23, T2 and G34 have larger reducible ratios, so that G23/T2 and G23/G34 should tend to be large. However, while the thicknesses of the lens elements and the air gap lengths are reduced, ratios thereamong should be proper to prevent any one of them from being excessively large, which may otherwise adversely affect the overall thickness reduction of the imaging lens 10, or to prevent any one of them from being excessively small, which may otherwise cause difficulty in assembly. In some embodiments, G23/T2 and G23/G34 may be further respectively defined as 0.3≤G23/T2≤0.9 and 1.1≤G23/G34≤3.0.

(5) Through value control of parameters, (T1+T4)/T2≤3.2, T2/T4≥0.6, and/or T1/T2≤1.7 are suggested. In consideration of lens fabrication techniques, since excessively thin T2 may cause low yield rate of lens fabrication, reduction in T2 is thereby limited. On the other hand, reduction in a sum of T1 and T4 is advantageous for reducing the thickness of the imaging lens 10, so that (T1+T4)/T2 and T1/T2 should tend to be small, and T2/T4 should tend to be large. However, while the thicknesses of the lens elements and the air gap lengths are reduced, ratios thereamong should be proper to prevent anyone of them from being excessively large, which may otherwise adversely affect the overall thickness reduction of the imaging lens 10, or to prevent any one of them from being excessively small, which may otherwise cause difficulty in assembly. In some embodiments, (T1+T4)/T2, T2/T4 and T1/T2 may be further respectively defined as 2.9≤(T1+T4)/T2≤0.2, 0.6≤T2/T4≤0.8, and 1.3≤T1/T2≤1.7.

(6) Through value control of parameters, ALT/Gaa≤4.3, T1/Gaa≤1.3, and/or (T1+T4)/Gaa≤2.4 are suggested. Since excessively small Gaa is adverse to assembly of the imaging lens 10, reduction in Gaa is thereby limited. In addition, reductions in ALT and a sum of T1 and T4 are advantageous for thin design of the imaging lens 10, so that ALT/Gaa, T1/Gaa and (T1+T4)/Gaa should tend to be small. However, while the thicknesses of the lens elements and the air gap lengths are reduced, ratios thereamong should be proper to prevent any one of them from being excessively large, which may otherwise adversely affect the overall thickness reduction of the imaging lens 10, or to prevent any one of them from being excessively small, which may otherwise cause difficulty in assembly. In some embodiments, ALT/Gaa, T1/Gaa and (T1+T4)/Gaa may be further respectively defined as 3.7≤ALT/Gaa≤4.3, 0.8≤T1/Gaa≤1.3 and 1.9≤(T1+T4)/Gaa≤2.4.

(7) Through value control of parameters, ALT/T4≥3.7, T3/G12≥1.9 and/or Gaa/G12≥1.5 are suggested. Under these conditions, lens parameters may be maintained appropriate, thereby avoiding any one of the parameters being excessively large that may disfavor the overall thickness reduction of the imaging lens 10, and avoiding any one of the lens parameters being excessively small that may cause difficulty in assembly or fabrication. However, while the thicknesses of the lens elements and the air gap lengths are reduced, ratios thereamong should be proper to prevent any one of them from being excessively large, which may otherwise adversely affect the overall thickness reduction of the imaging lens 10, or to prevent any one of them from being excessively small, which may otherwise cause difficulty in assembly. In some embodiments, ALT/T4, T3/G12 and Gaa/G12 may be further respectively defined as 3.7≤ALT/T4≤3.9, 1.9≤T3/G12≤3.4 and 1.5≤Gaa/G12≤3.0.

Although the design of an optical system is generally associated with unpredictability, satisfaction of the aforementioned relationships may enable the imaging lens 10 to have reductions in the system length and the F-number, to have a wider field of view, to enhance imaging quality, or to have a relatively higher yield rate of assembly, thereby alleviating at least one drawback of the prior art.

To sum up, effects and advantages of the imaging lens 10 according to the present disclosure are described hereinafter.

1. The positive refractive power of the first lens element 3 may provide a part of overall positive refractive power required by the imaging lens 10, thereby favoring reduction in the system length of the imaging lens 10 that may enhance miniaturization of the imaging lens 10. In addition, the positive refractive power of the third lens element 5 is advantageous for distributing the positive refractive power of the first lens element 3, thereby favorably lowering manufacture sensitivity of the lens elements. Moreover, by further cooperation of the negative refractive powers of the second lens element 4 and the fourth lens element 6, optical aberrations may be thereby corrected.

2. By cooperation of the aperture stop 2 disposed at the object side of the first lens element 3, the convex portion 311, the convex portion 312, the convex portion 322, the concave portion 411, the concave portion 412, the concave portion 512, the convex portion 521, the convex portion 522, the convex portion 611, the concave portion 621 and the convex portion 622, the imaging quality of the imaging lens 10 may be enhanced.

3. Through design of the relevant lens parameters, optical aberrations, such as spherical aberration, may be reduced or even eliminated. Further, through surface design and arrangement of the lens elements 3-6, even with the system length reduced, optical aberrations may still be reduced or even eliminated, resulting in relatively good optical performance.

4. Through the aforesaid five embodiments, it is evident that the system length of this disclosure may be reduced down to below 2.2 mm, so as to facilitate developing thinner relevant products with economic benefits.

Figure 28:
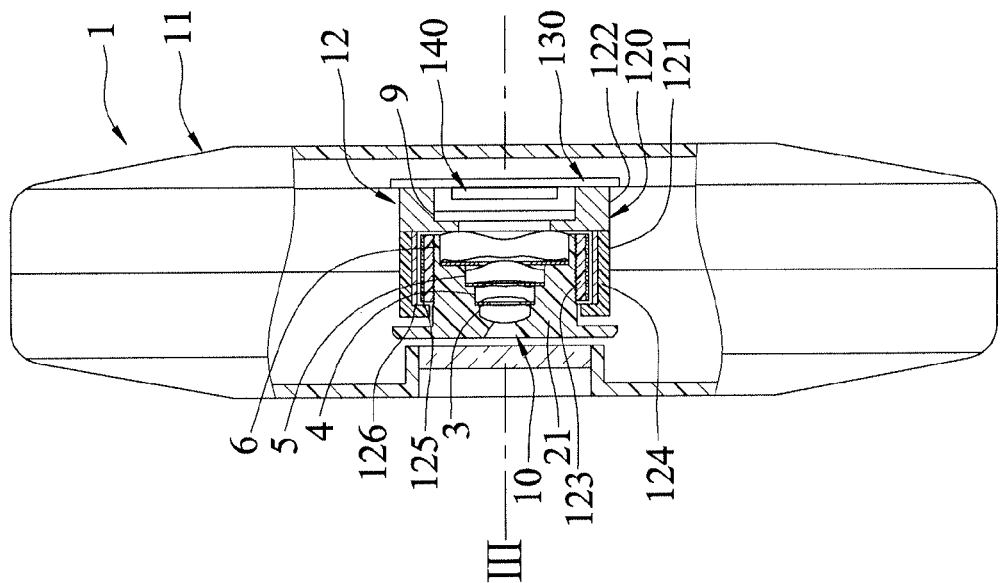
FIG. 28 is a schematic partly sectional view to illustrate a first exemplary application of the imaging lens of the present disclosure.

Shown in FIG. 28 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, a substrate 130 on which the holder unit 120 is disposed, and an image sensor 140 disposed on the substrate 130 in location of the image side of the imaging lens 10. The image plane 100 (see FIG. 6) is formed on the image sensor 140.

The holder unit 120 includes a first holder portion 121 in which the barrel 21 is disposed, and a second holder portion 122 having a portion interposed between the first holder portion 121 and the image sensor 140. The barrel 21 and the first holder portion 121 of the holder unit 120 extend along an axis (II), which coincides with the optical axis (I) of the imaging lens 10.

Figure 29:
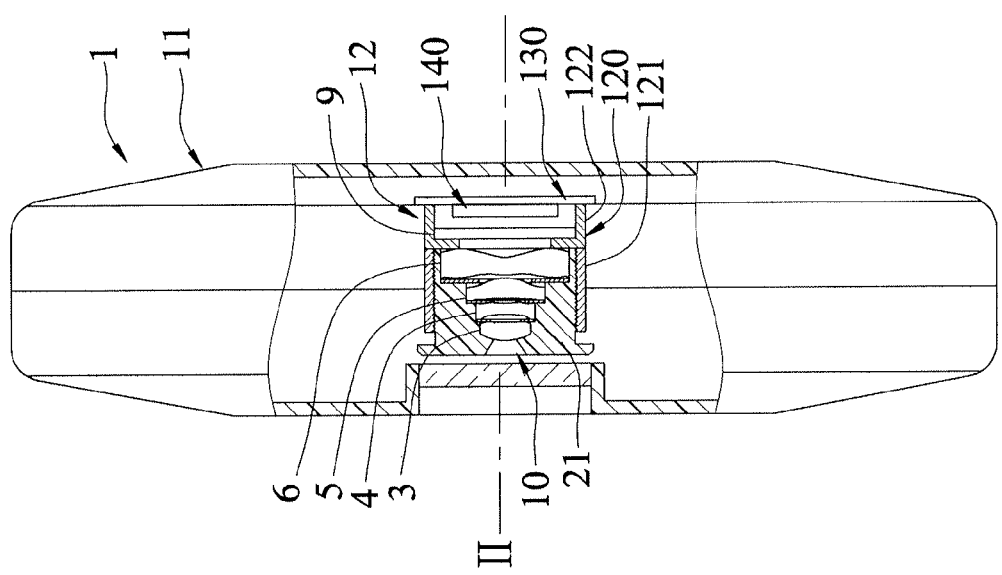
FIG. 29 is a schematic partly sectional view to illustrate a second exemplary application of the imaging lens of the present disclosure.

Shown in FIG. 29 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 140 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present disclosure, the electronic apparatus 1 in each of the exemplary applications may be configured to have a relatively reduced overall thickness with good optical and imaging performance, so as to reduce cost of materials, and satisfy requirements of product miniaturization.

While the present disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element and a fourth lens element arranged in order from an object side to an image side along an optical axis of said imaging lens, each of said first lens element, said second lens element, said third lens element and said fourth lens element having a refractive power, an object-side surface facing toward the object side, and an image-side surface facing toward the image side, wherein:

said first lens element has a positive refractive power, said object-side surface of said first lens element has a convex portion in a vicinity of the optical axis and a convex portion in a vicinity of a periphery of said first lens element, and said image-side surface of said first lens element has a convex portion in a vicinity of the periphery of said first lens element;

said second lens has a negative refractive power, and said object-side surface of said second lens element has a concave portion in a vicinity of the optical axis and a concave portion in a vicinity of a periphery of said second lens element;

said third lens element has a positive refractive power, said object-side surface of said third lens element has a concave portion in a vicinity of a periphery of said third lens element, and said image-side surface of said third lens element has a convex portion in a vicinity of the optical axis and a convex portion in a vicinity of the periphery of said third lens element;

said fourth lens element has a negative refractive power, said object-side surface of said fourth lens element has a convex portion in a vicinity of the optical axis, and said image-side surface of said fourth lens element has a concave portion in a vicinity of the optical axis and a convex portion in a vicinity of a periphery of said fourth lens element;

said imaging lens does not include any lens element with a refractive power other than said first lens element, said second lens element, said third lens element and said fourth lens element; and said imaging lens satisfies TTL/T4≤6.7, (T1+T4)/T2≤3.2, ALT/T3≤3.6, and G12/G34≤4.5, where TTL represents a distance between said object-side surface of said first lens element and an image plane at the optical axis, ALT represents a sum of thicknesses of said first lens element, said second lens element, said third lens element and said fourth lens element at the optical axis, T1 represents a thickness of said first lens element at the optical axis, T2 represents a thickness of said second lens element at the optical axis, T3 represents a thickness of said third lens element at the optical axis, T4 represents a thickness of said fourth lens element at the optical axis, G12 represents an air gap length between said first lens element and said second lens element at the optical axis, and G34 represents an air gap length between said third lens element and said fourth lens element at the optical axis.

2. The imaging lens as claimed in claim 1, further satisfying $0.3 \leq G23/T2 \leq 0.9$, where G23 represents an air gap length between said second lens element and said third lens element at the optical axis.

3. The imaging lens as claimed in claim 2, further satisfying $0.6 \leq T2/T4 \leq 0.8$.

4. The imaging lens as claimed in claim 2, further satisfying $T2/G34 \leq 4.0$.

5. The imaging lens as claimed in claim 1, further satisfying $3.7 \leq ALT/T4 \leq 3.9$.

6. The imaging lens as claimed in claim 5, further satisfying $T1/T2 \leq 1.7$.

7. The imaging lens as claimed in claim 5, further satisfying $1.9 \leq T3/G12 \leq 3.4$.

8. The imaging lens as claimed in claim 5, further satisfying $1.5 \leq Gaa/G12 \leq 3.0$, where Gaa represents a sum of three air gap lengths among said first lens element, said second lens element, said third lens element and said fourth lens element at the optical axis.

9. The imaging lens as claimed in claim 5, further satisfying $1.1 \leq G23/G34 \leq 3.0$, where G23 represents an air gap length between said second lens element and said third lens element at the optical axis.

10. The imaging lens as claimed in claim 1, further satisfying $ALT/Gaa \leq 4.3$, where Gaa represents a sum of three air gap lengths among said first lens element, said second lens element, said third lens element and said fourth lens element at the optical axis.

11. The imaging lens as claimed in claim 1, further satisfying $T1/Gaa \leq 1.3$, where Gaa represents a sum of three air gap lengths among said first lens element, said second lens element, said third lens element and said fourth lens element at the optical axis.

12. The imaging lens as claimed in claim 1, further satisfying $(T1+T4)/Gaa \leq 2.4$, where Gaa represents a sum of three air gap lengths among said first lens element, said second lens element, said third lens element and said fourth lens element at the optical axis.

13. An electronic apparatus comprising:

a housing; and an imaging module disposed in said housing, and including an imaging lens as claimed in claim 1, a barrel on which said imaging lens is disposed, a holder unit on which said barrel is disposed, a substrate on which said holder unit is disposed, and an image sensor disposed on said substrate in location of the image side of said imaging lens.

* * * * *